United States Patent
Zhang et al.

(10) Patent No.: US 10,519,278 B2
(45) Date of Patent: Dec. 31, 2019

(54) METHODS OF MAKING POLYPEPTIDES

(71) Applicant: Board of Supervisors of Louisiana State University and Agricultural and Mechanical College, Baton Rouge, LA (US)

(72) Inventors: Donghui Zhang, Baton Rouge, LA (US); Jinbao Cao, Baton Rouge, LA (US); Brandon Chan, Baton Rouge, LA (US); David Siefker, Baton Rouge, LA (US)

(73) Assignee: BOARD OF SUPERVISORS OF LOUISIANA STATE UNIVERSITY, Baton Rouge, LA (US)

( * ) Notice: Subject to any disclaimer, the term of this patent is extended or adjusted under 35 U.S.C. 154(b) by 0 days.

(21) Appl. No.: 15/687,397

(22) Filed: Aug. 25, 2017

(65) Prior Publication Data

US 2018/0057634 A1 Mar. 1, 2018

Related U.S. Application Data

(60) Provisional application No. 62/380,783, filed on Aug. 29, 2016.

(51) Int. Cl.
| | |
|---|---|
| *C08G 69/42* | (2006.01) |
| *C08G 69/00* | (2006.01) |
| *C08G 69/04* | (2006.01) |
| *C08G 69/10* | (2006.01) |

(52) U.S. Cl.
CPC ............ *C08G 69/00* (2013.01); *C08G 69/04* (2013.01); *C08G 69/10* (2013.01); *C08G 69/42* (2013.01)

(58) Field of Classification Search
CPC ...................................................... C08G 69/42
USPC ......................................... 528/360, 377, 378
See application file for complete search history.

(56) References Cited

FOREIGN PATENT DOCUMENTS

JP    2005154768 A    6/2005

OTHER PUBLICATIONS

Cao et al; "Peptidomimetic polymers: Development of new chemistry and functional materials", Nov. 2016; 72 nd Southwest Regional Meeting of teh American Chemical Society, TX; Conference, Meeting Abstract; 2016: 1827141.( 2 of 2 CAPLUS in 15/687397 STN-CPC).*
Kricheldorf I, Primary amine-initiated-N-Thiocarbonic acid anhydrosulfide, Journal of Mcromolecular Science, 2008, 45, 425-430. (Year: 2008).*
Kricheldorf II, Secondary Strcuture of Peptides, Macromolecules 1983, 16, 615-623. (Year: 1983).*
Kanazawa, H. Amino Acid N-Carboxy Anhydrides with High Polymerizability in the Solid State. Mol. Cryst. Liq. Cryst. Sci. Technol., Sect. A 1998, 313, 205-210.
(Continued)

*Primary Examiner* — Duc Truong
(74) *Attorney, Agent, or Firm* — Thomas|Horstemeyer, LLP

(57) ABSTRACT

Various embodiments disclosed relate to a method of forming a polypeptide. The method includes contacting a first amino acid-derived N-thiocarboxyanhydrosulfide monomer as a crystalline solid with a polymerization initiator (e.g., in an alkane suspension) to give a polypeptide product. The method further includes contacting the polypeptide product with a second amino acid-derived N-thiocarboxyanhydrosulfide monomer in an alkane suspension.

14 Claims, 3 Drawing Sheets

(56) References Cited

OTHER PUBLICATIONS

Kanazawa, H.; Ohashi, Y. Polymerization of N-Carboxy Anhydrides of L- and DL- Valine, and L- and DL- Phenylalanine in the Solid StateMol. Cryst. Liq. Cryst. Sci. Technol., Sect. A 1996, 277, 45-54.

Kanazawa, H.; Kawai, T. J. Polymerization of N-Carboxy- Amino Acid Anhydrides in the Solid State. I. Polymerizability of the Various a-Amino Acid NCAs in the Solid StatePolym. Sci., Polym. Chem. Ed. 1980, 18, 629-642.

Kanazawa, H.; Ohashi, Y.; Sasada, Y.; Kawai, T. J. Polymerization of N-Carboxy-Amino Acid Anhydrides Polymerizability and Molecular Arrangement in LLeucine NCA and L-Alanine NCA CrystalsPolym. Sci., Polym. Phys. Ed. 1982, 20, 1847-1862.

Kanazawa, H.; Inada, A.; Kawana, N. Re-examination of the Reactivity of N-Carboxy Amino Acid Anhydrides 1. Polymerisation of Amino Acid NCAs in Acetonitrile and in the Solid State in HexaneMacromol. Symp. 2006, 242, 104 -112.

Kanazawa, H. Investigation of the solid-state polymerization of N-carboxy-amino acid anhydrides with reference to their crystal structures. Polymer 1992, 33, 2557-2566.

Miller, E.; Fankuchen, I.; Mark, H. Polymerization in the Solid State. J. Appl. Phys. 1949, 20, 531-533.

Kricheldorf, H. R. Uber die Polymerisation von a-Aminosaure-N-carboxy anhydriden (1,3-Oxazolidin-2,5-dionen) und a-Aminosaure-N-thiocarbox yanh ydriden (1,3-Thiazolidin-2,5-dionen)Makromol. Chem. 1974, 175, 3325-3342. (English abstract provided).

Kricheldorf, H. R. Zur weiteren Kenntnis der Oxazolidindione-(2.5) und Thiazolidindione-(2.5)Chem. Ber. 1971, 104, 3146-3155. (English abstract provided).

Kricheldorf, H. R.; Sell, M.; Schwarz, G. J. Primary Amine-Initiated Polymerizations of a-Amino Acid N-Thiocarbonic Acid Anhydrosulfide Macromol. Sci. A. 2008, 45, 425-430.

\* cited by examiner

Scheme 1

METHODS OF MAKING POLYPEPTIDES

CROSS-REFERENCE TO RELATED APPLICATIONS

This application claims the benefit of priority to U.S. Provisional Appl. Ser. No. 62/380,783, filed Aug. 29, 2016, which is incorporated by reference as if fully set forth herein.

STATEMENT OF GOVERNMENT SUPPORT

This invention was made with Government support under Contract CHE0955820 awarded by the National Science Foundation. The U.S. Government has certain rights in this invention.

BACKGROUND

Polypeptides are polymers having repeating units formed form amino acids. A polypeptide can form all or part of a protein. In order to study polypeptides and other biomolecules it can be desirable to synthesize polypeptides in the laboratory. Synthesis of polypeptides, however, can be difficult. There is therefore a need to develop a new and robust method for the synthesis of polypeptides.

BRIEF DESCRIPTION OF THE FIGURES

The drawings illustrate generally, by way of example, but not by way of limitation, various embodiments discussed in the present document.

DESCRIPTION

Figure 1:
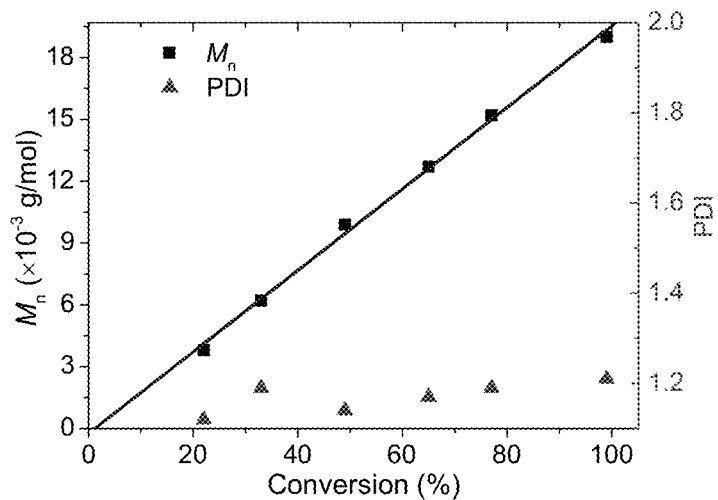
FIG. 1 is a plot showing the $M_n$ (number average molecular weight) and PDI (molecular weight distribution) versus conversion of monomers into polypeptides according to an embodiment of the disclosure. Plot of $M_n$ (■) and PDI (▲) versus conversion for the sROP of BG NTA in hexanes suspension at 50° C. (([M]$_0$:[I]$_0$=80:1; [M]$_0$=0.2M) together with the linear fit (–). Of the $M_n$ versus conversion plot.
Figure 2:
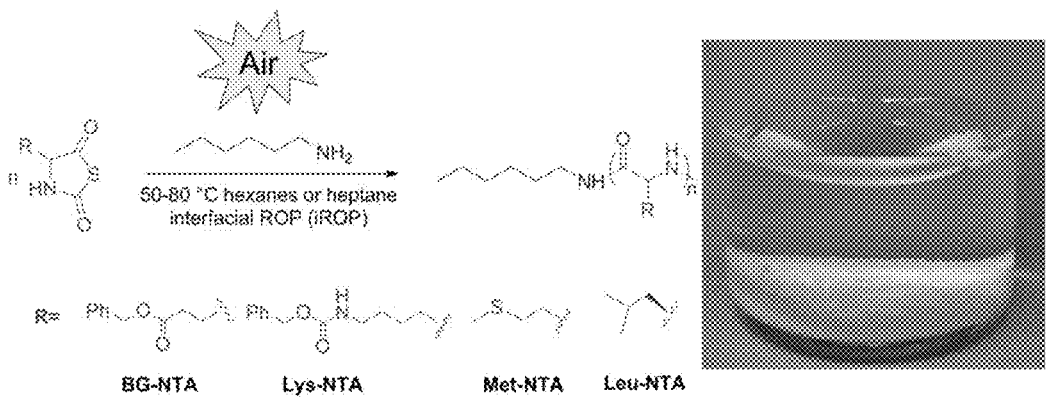
FIG. 2 illustrates a scheme for producing a polypeptide and a polypeptide formed according to the scheme.

Polypeptides can be prepared by the ring-opening polymerization (ROP) of amino acid-derived α-amino acid N-carboxyanhydrides (NCA)s in solution and occasionally in the solid phase. A variety of initiating systems can mediate the controlled polymerization of various NCAs to produce well-defined polypeptides having diverse structures. However, NCA monomers are moisture sensitive and thermally unstable resulting in poor shelf-life. Anhydrous conditions or low temperature is required during the synthesis, purification, and storage of NCA monomers. For example, dry flash chromatography in the glovebox using anhydrous silica gel and solvents was developed to purify glyco-NCA monomers due to their moisture instability. In addition, highly toxic phosgene or phosgene-derived reagents are required in the synthesis of NCA monomers. The synthesis of polypeptides using activated amino acids urethane derivatives is possible to form NCAs in situ and polymerize in a chain growth fashion. However, the polypeptides are mostly limited to low to moderate molecular weight (DP<100). Furthermore, all polymerizations of pre-formed or in situ generated NCA monomers require anhydrous conditions, limiting the broad use of polypeptides by researchers who are not equipped with advanced synthetic facilities. Therefore it is desirable to further develop alternative and robust synthetic approach to access well-defined polypeptides with diverse structures.

Unlike NCA monomers, NTA monomers are shown to have significantly enhanced moisture stability, resulting in long shelf-life. But there is no evidence that amino acid-derived NTA monomers can be used in interfacial ring-opening polymerizations (iROPs) of NTAs to produce the corresponding polypeptides in a controlled manner; under mild conditions; and/or in open air. The various embodiments described herein demonstrate such iROPs using NTAs.

Embodiments relate to methods of forming a polypeptide comprising: contacting an amino acid-derived N-thiocarboxyanhydrosulfide monomer with a polymerization initiator to give a polypeptide. In some embodiments, the N-thiocarboxyanhydrosulfide monomer has a structure according to Formula I:

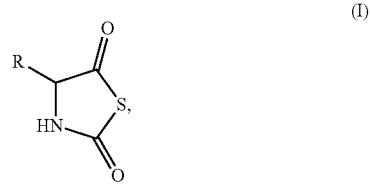

wherein R represents an amino acid side-chain (e.g., an amino acid side-chain is selected from the group consisting of, glutamate, lysine, methionine, leucine, and combinations thereof).

In some embodiments, the polymerization initiator is selected from the group consisting of, a $C_3$-$C_6$ alkyl amine, a $C_4$-$C_6$ cyclic amine, a $C_2$-$C_5$ heteroarylamine, and combinations thereof. Examples of specific, non-limiting polymerization initiators include a $C_3$-$C_6$ alkyl amine selected from the group consisting of, butylamine, pentylamine, hexylamine, trimethylamine, and combinations thereof; a $C_4$-$C_6$ cyclic amine selected from the group consisting of pyrrolidine, piperidine, piperazine, and combinations thereof; and a $C_2$-$C_5$ heteroaryls selected from the group consisting of pyrrole, imidazole, pyridine, and combinations thereof. In some embodiments, the polymerization initiator is hexylamine.

In some embodiments, the contacting occurs as an alkane suspension of the amino acid-derived N-thiocarboxyanhydrosulfide monomer with the polymerization initiator. In such embodiments, the alkane suspension comprises at least one alkane. Examples of suitable at least one alkane include pentanes, hexanes, heptanes, and combinations thereof. In other embodiments, the contacting occurs at an interface of a solid amino acid-derived N-thiocarboxyanhydrosulfide monomer. The product that arises from the contacting can be a homopolymer or a random copolymer of the monomer, when two or more different monomers of the formula (I) are used.

Embodiments also relate to polypeptides formed according to the methods described herein.

According to several embodiments described herein, interfacial polymerization of amino acid-derived NTAs (e.g., γ-benzyl-glutamate, ε-Cbz-lysine and methionine-derived, referred to herein as BG NTA, LYS NTA, and MET NTA respectively) is accomplished. Interfacial polymerization of amino acid-derived NTAs using a primary amine initiator according to the various embodiments described herein can produce well-defined polypeptides with controlled molecular weight ($M_n$) and low-to-moderate molecular weight distribution (PDI), whereas the solution phase polymerization is slow and results in poor conversions (e.g., about 5% to about 12% conversion). Without intending to be bound by any specific theory the inventors believe that the enhanced control of the polymerization may be attributed to the increased relative rate of propagation versus chain termination via isocyanate formation in nonpolar solvents. While not wishing to be bound by any specific theory, the iROP is believed to operate by the normal-amine mechanism (NAM) as evidenced by end-group analysis. In addition, one advantage of using iROP of amino acid-derived NTAs is that the reaction can be conducted in open air without significant change of the $M_n$ and PDI control from those conducted under air-free conditions.

For example, the $M_n$ can range from about 5,000 g/mol to about 60,000 g/mol, or about 15,000 g/mol to about 30,000 g/mol, or less than about, equal to about, or greater than about 10,000 g/mol, 15,000, 20,000, 25,000, 30,000, 35,000, 40,000, 45,000, 50,000, 55,000 g/mol. The low-to-moderate weight distribution PDI can range from about 1 to about 2, or from about 1.20 to about 1.30, or less than about, equal to about, or greater than about 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, or 1.95. the monomer conversion percentage can range from about 20% conversion to about 100% conversation, or about 70% conversion to about 100% conversation, or less than about, equal to about, or greater than about, 25% conversion, 30, 35, 40, 45, 50, 50, 55, 60, 65, 70, 75, 80, 85, 90, or 95% conversation.

Figure 4:
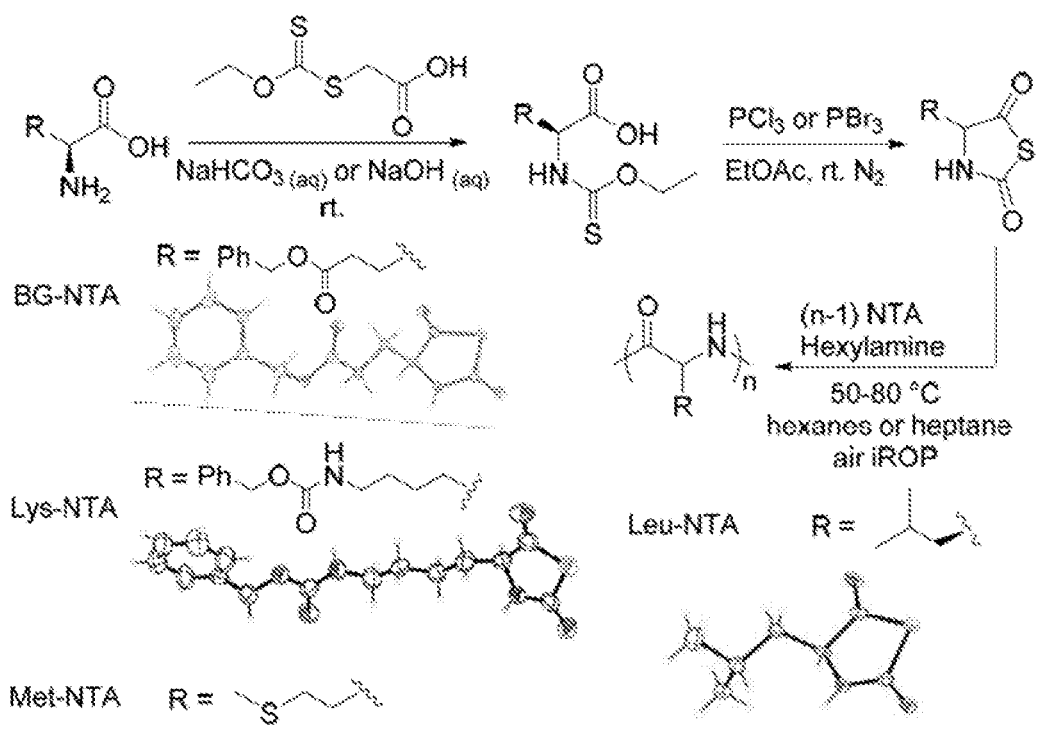
FIG. 4 illustrates Scheme 1 for the synthesis of the amino acid-derived NTA monomers in two steps from the corresponding amino acids.

According to various embodiments described herein, the amino acid-derived NTA monomers can be synthesized in two steps from the corresponding amino acids. See, e.g., Scheme 1 (FIG. 4).

The resulting amino acid-derived NTAs can be readily obtained by known purification methods, including flash column chromatography in open air with good yields (e.g., 50-60%) and high purity. The amino acid-derived NTA structures have been unambiguously verified by NMR, MS and X-ray crystallography. According to various embodiments R can include a side chain of any naturally occurring or non-naturally occurring amino acid. In some embodiments the amino acid side chain can include the side chain of glycine, alanine, valine, leucine, isoleucine, proline, phenylalanine, tyrosine, tryptophan, serine, threonine, cysteine, methionine, asparagine, glutamine, lysine, arginine, histidine, aspartate, or glutamate. In other embodiments the amino acid side chain is selected from glutamate, lysine, methionine, and leucine. Any amino acid that is used can be in the D or L form.

The amino acid-derived NTAs of the various embodiments described herein are more stable against moisture and heat than NCA analogs. For example, when stored as solids in open air or in a desiccator (with Drierite) at room temperature, BG NTA has a shelf-life of 2 months or a minimum of 5 months respectively, whereas BG NCA started to become hydrolyzed in less than 11 days or 1 month period. Without intending to be bound by any specific theory the inventors believe that the high stability of the NTAs of the various embodiments described herein against moisture may be due to the less electrophilic nature of the carbonyl [O=C(5)] of NTAs relative to that of NCAs. This is consistent with the observed lower carbonyl stretch frequency of BG-NTAs (1717 cm$^{-1}$) relative to that of BG NCAs (1842 cm$^{-1}$). In addition, thermogravimetric analysis (TGA) revealed that BG NTA is thermally much more stable than the NCA analog, evidenced by a significant higher onset of thermal degradation temperature at 225° C. than that of the NCA (122° C.) under nitrogen. The phosgene free synthesis, the enhanced thermal stability, and long shelf-life of NTAs relative to the NCA analogs significantly enhance the appeal of the former as substrate for polypeptide synthesis.

Suitable initiators for the iROP of the amino acid-derived NTAs of the various embodiments described herein include amine, heteroaryl, and metal-complex initiators. Examples of amine initiators include, but are not limited to $C_3$-$C_6$ (mono, di, tri) alkyl amines (e.g., butylamine, pentylamine, hexylamine, triethylamine, and the like), $C_4$-$C_6$ cyclic amines (e.g., pyrrolidine, piperidine, piperazine, and the like), and hexamethyldisilazane. Examples of heteroaryl initiators, include $C_2$-$C_5$ heteroaryls containing one, two or three nitrogen atoms in the ring (e.g., pyrrole, imidazole, pyridine, and the like).

A solvent can be used to polymerize the amino acid-derived N-thiocarboxyanhydrosulfide monomer. Suitable solvents are solvents that dissolve the initiator but do not substantially dissolve the monomer. Such solvents include alkanes such as pentanes, hexanes, and heptanes.

Hexylamine shows polymerization activity (5% conversion) in dioxane after 2 days at room temperature under nitrogen or in open air. Increasing temperature to 50° C. still resulted in low conversions (e.g., about 5% to about 12% conversion) for all initiators. See Table 2. High temperature is known to promote undesired side reactions (e.g., transamidation to form pyroglutamate) that can terminate polymerization prematurely. To further enhance the polymerization under mild conditions, the inventors set to investigate the interfacial polymerization (iROP) of BG NTA and others. Primary amines can initiate the iROPs of several amino acid-derived NCA crystals in the hexanes or heptane suspension under mild conditions (50-80° C.) (Table 1).

The inventors found that the interfacial polymerization of BG NTA in a hexanes suspension of the monomer in the presence of soluble primary amine initiators produced the corresponding poly(γ-benzyl-glutamate) (PBG) with high conversion at 50° C. after 2 d, in stark contrast to the low activity of the solution phase polymerization. The polymer molecular weight ($M_n$) can be readily controlled by adjusting the initial monomer to initiator ratio and agree well with the theoretical values for controlled polymerization (Entry 1-5, Table 1). The molecular weight distribution is modest in the 1.2-1.3 range. The $M_n$ was also shown to track linearly with the conversion with low PDIs (<1.2) throughout the reaction course (see, e.g., FIG. 1), indicating controlled polymerization characteristic. The polymerization remains fast as evidenced by the conversion versus time plot. MS analysis of a low molecular polymer sample revealed that iROP of BG NTA occurs by a normal amine mechanism where the primary amine initiates the interfacial polymerization of BG NTA by regio-selective addition to the C5-carbonyl position. A small fraction of polymer chain was also found to be terminated with the pyroglutamate chain end, consistent with the undesired transamidation of the growing chain ends resulting in termination of chain growth.

Figure 3:
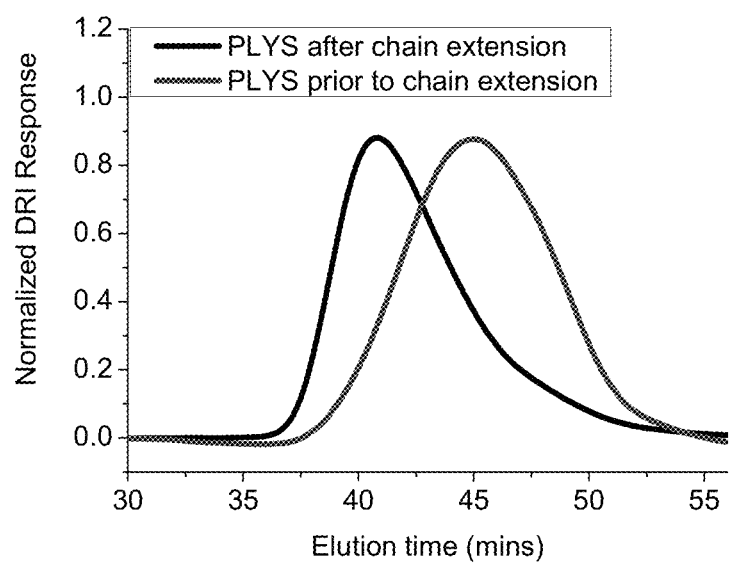
FIG. 3 is an SEC chromatogram plot of DRI response as a function of elution time (mins) for PLYS polymers obtained from the chain extension experiment by interfacial ring-opening polymerization (iROP) of Lys-NTA (2% ee) in heptane at 80° C. The red and black curves respectively correspond to the PLYS polymers obtained from the first ([M]$_0$:[I]$_0$=50:1) and second iROP of Lys-NTA ([M]$_0$: [[I]$_0$=57:1) that were conducted sequentially, Each step of the polymerization was allowed.

It was further shown that several other NTA monomers (e.g., LYS NTA, LEU NTA, MET NTA) can also be polymerized to yield the corresponding polypeptides with targeted molecular weights and low PDI by the iROP method (Entry 6-10, Table 1). Furthermore, by chain extension experiment of PLYS, it was demonstrated that the polypeptides made by iROP can be used to initiate additional polymerizations of NTAs, suggesting the living nature of the polypeptide chains (FIG. 3).

The control of the polymerization of amino-acid-derived NTAs is strongly dependent on the solvent. It is believed that the solvent increases the rate of propagation versus termination allowing for high conversion of monomer in nonpolar solvents versus polar solvents. For example, while Leu-NTA is fully dissolved in both hexanes and dioxane at 50° C., the polymerization in hexanes proceeds to quantitative conversions after 2 days. While under similar conditions, the reaction in dioxane reaches low conversions (9-36%). It was further shown by, ESI MS analysis of the products from the stoichiometric reaction between Leu-NTA and hexylamine in 50° C. hexanes revealed the clean formation of oligomeric PLEU by the normal-amine ROP mechanism This is also supported by the presence of a single carbonyl peak at 175.7 ppm in the corresponding $^{13}C\{^1H\}$ NMR spectrum. By contrast, the same stoichiometric reaction in 50° C. dioxane yielded a large fraction of oligomeric PLEU terminated by the hexyl urea end group, along with the oligomeric $PLEU_n$ formed by the normal-amine ROP pathway. $^{13}C\{^1H\}$ NMR analysis of the reaction product also revealed multiple sets of peaks in the carbonyl region, several of which at ~172-175 ppm disappeared upon further nitrogen purging and were tentatively assigned to be the oligomeric PLEUn species bearing thiocarbamic acid/thiocarbamate end groups. Consistently, MALDITOF MS analysis of the poly (L-leucine) (PLEU) obtained from the polymerization in dioxane also revealed a notable presence of urea-terminated polypeptides in addition to PLEU chains expected from a normal amine mechanism. Furthermore, it was found that polymerization of BG-NTA and Lys-NTA conducted in room-temperature DMF ([M]0=0.5 M, [M]0:[I]0=80:1) under a constant flow of nitrogen reproducibly resulted in higher conversion (44% and 47%) than those (12% and 6%) obtained without the nitrogen flow. Suggesting that the release of carbonyl sulfide (COS) is the rate-limiting step in the chain propagation. The peaks at 157-158 ppm are consistent with the urea linkages and remain unchanged with $N_2$ purging. Based on these results, the controlled polymerization of NTAs is attributed to nonpolar solvents (e.g., hexanes) having a faster elimination of COS from the propagating thiocarbamic acid/thiocarbamate intermediates to form the active propagating amine species relative to the elimination of $H_2S$ to form an isocyanate intermediate which terminates the chain growth via the formation of urea species. By contrast, in polar solvent (e.g., dioxane), the termination reaction becomes kinetically competitive relative to the formation of active propagating amine species, resulting in low conversions. This mechanistic theory also explains why primary amine-initiated ROP of N-substituted NTAs afforded high conversion in various solvents. Without N—H proton, the formation of an isocyanate intermediate to termination chain growth is suppressed.

Crystal packing of the amino acid-derived NTAs of the various embodiments described herein can be determined using methods known in the art, including X-ray crystallographic analysis. Crystal packing of NTAs could be a factor influencing polymerization behavior. To that end, batches of the BG NTA monomers recrystallized under various conditions were prepared. X-ray crystallographic analysis of BG NTA single-crystals revealed the formation of lamellar packing of BG NTA. XRD analysis of the polycrystalline BG NTA revealed similar crystalline packing structures and high level of crystallinity (>95%) of monomers obtained under different crystallization conditions. Polymerization of these different batches of BG NTA under standard iROP conditions produced PBG polymers having nearly identical $M_n$ and PDI. These results suggest that, at least with BG NTA, the observed controlled polymerization characteristics are the result of interfacial polymerization between the soluble monomer and insoluble polymer chains and that the crystal structure has limited impact on the $M_n$ and PDI control.

In this disclosure, the inventors demonstrate for the first time that polypeptides with controlled $M_n$ and PDI can be obtained from the interfacial ROPs of amino acid-derived NTA monomers using soluble initiators (e.g., primary amine initiators) under mild conditions in open air. The iROP reactions appear to proceed by a normal amine mechanism. The controlled polymerization behavior of iROP is believed to be the direct result of enhanced rate of propagation versus rate of termination. In view of the facile synthesis of various amino acid-derived NTA monomers, their significantly enhanced moisture and thermal stability, and long shelf-life relative to the analogous NCAs, iROP of amino acid-derived NTAs represent an attractive alternative synthetic method to access well-defined polypeptides with controlled molecular characteristics and greatly reduced operational complexity.

Examples

The present invention can be better understood by reference to the following examples which are offered by way of illustration. The present invention is not limited to the examples given herein.

Materials.

All chemicals were purchased from Sigma-Aldrich and used as received unless specified. L-glutamic acid γ-benzyl ester (H-Glu(OBz)-OH) and ε-N-carbobenzyloxy-L-lysine (H-Lys(Z)—OH) were purchased from AAPPTec, LLC and used as received. BG-NCA was synthesized by using a published procedure. 1 All solvents are regular ACS grade solvents and used directly in the reactions without any special drying or purification step unless specified. All reactions are conducted in open air unless otherwise noted.

Instrumentation.

$^1H$ and $^{13}C$ NMR spectra were recorded on a Bruker AV-400 or AV-500 spectrometer. Chemical shifts in parts per million (ppm) were referenced relative to proton impurities or $^{13}C$ isotope of deuterated solvents (e.g., $CDCl_3$). SEC-DRI analyses were performed with an Agilent 1200 system equipped with three Phenomenex 5 μm, 300×7.8 mm columns [100 Å, 1000 Å and Linear(2)], Wyatt DAWN EOS multi-angle light scattering (MALS) detector (GaAs 30 mW laser at λ=690 nm) and Wyatt Optilab rEX differential refractive index (DRI) detector with a 690 nm light source. DMF containing 0.1 M LiBr was used as the eluent at a flow rate of 0.5 mL·min-1. The temperature of the column and detector was 25° C. FTIR spectra were collected on a Bruker Alpha FT-IR spectrometer. Electrospray ionization mass spectroscopy (ESI MS) was conducted on an ESI TOF 6210

(Electrospray Time-of-Flight) mass spectrometer (Agilent Technologies). Samples were prepared by dissolving 5 mg sample in 0.5 mL chloroform. The experiments were carried out in positive mode ionization. MALDI-TOF MS experiments was conducted on a Bruker UltrafleXtreme tandem time-of-flight (TOF) mass spectrometer. The instrument was calibrated with Peptide Calibration Standard II consisting of standard peptides Angiotensin I, Angiotensin II, Substance P, Bombesin, ACTH clip 1-17, ACTH clip 18-39, and Somatoratin 28 (Bruker Daltonics, Billerica, Mass.) prior to experiment. A saturated methanol solution of α-cyano-4-hydroxycinnamic acid was used as matrix. Samples were prepared by mixing 5 mg/ml THF solution of polymers with matrix at 1:1 volume ratio, which were then deposited onto a 384-well ground-steel sample plate using the dry droplet method. Experiments were done in positive reflector mode. The data analysis was performed with flexAnalysis software. Structures of both resolved (S) and racemic forms of BG NTA were determined from data collected at T=90K with MoKα radiation on a Bruker Kappa Apex-II diffractometer equipped with a Triumph focusing monochromator. The S form, space group P2$_1$2$_1$2$_1$, exhibited a substitutional disorder in which the R enantiomer was also present with 0.059(2) population. The absolute configuration was confirmed, with Flack parameter x=0.056(16). The racemic form of BG NTA, space group P2$_1$/c, also exhibited a similar disorder, with the two enantiomeric molecules overlapped with 0.9509:0.0491(14) populations. The structure of the S form of LSY NTA, space group P2$_1$, was determined from data collected at T=200K with MoKα radiation on a Nonius KappaCCD diffractometer. A phase change with twinning occurs below about 180K, so data were collected from a single crystal at a higher temperature. The asymmetric unit has two independent molecules, and no indication of the presence of the R enantiomer was evident. The absolute configuration was confirmed, with Flack parameter x=0.12 (9). CIFs have been deposited at the Cambridge Crystallographic Data Centre, CCDC 1479402-1479404. Single crystals of the NTA monomers for the X-ray structure determination was prepared by slow solvent evaporation of solvent from a chloroform solution of the monomers. TGA experiments were carried on TA 2950 TGA under nitrogen atmosphere with a heating rate of 10° C./min. The scanned temperature range was rt.-600° C. Data was analyzed with Thermal Advantage Software. The X-ray powder diffraction (XRD) measurements were performed on in-house PNAnalytical Empyrean instrument, using the characteristic X-ray of Cu target. The range of scattering angle covers from 4 degree up to 90 degree. The correction to a fixed slit was done before the analysis of spectrum. The samples were ground to powder and uniformly distributed on a zero-background silicon wafer for the measurements. The background of the silicon wafer was also measured and subtracted from the spectra before further analysis to obtain the crystallinity. After subtracting the background, in a spectrum, the scattering contribution of amorphous structure is determined by fitting the selected data points connecting the bottom of peaks to describe the overall shape of the amorphous region, using spline interpolation. The crystallinity value is calculated as the ratio of peak area, which corresponds to the crystalline contribution, to the total area, which is the sum of the peak area and the area below the baseline for amorphous region.

Synthesis of S-Ethoxythiocarbonyl Mercaptoacetic Acid (XAA).

The synthesis route is modified from a published procedure. 3 NaOH (9.31 g, 23.3 mmol) was first dissolved in chilled deionized (DI) water (233 mL), followed by addition of chloroacetic acid (22.02 g, 23.30 mmol) to afford a clear solution. Potassium ethyl xanthogenate (37.36 g, 23.31 mmol) was then added to the above solution. The mixture was allowed to stir at room temperature for one day, followed by acidification with 4 M HCl to pH~1. The resulting cloudy mixture was then extracted with chloroform (3×150 mL). The combined organic extract was dried over MgSO$_4$ and concentrated under vacuum. Hexanes (500 mL) was then added to the oily residue with vigorous stirring to afford an off-white solid. The solid was collected by filtration and washed with hexanes and dried under vacuum to give the final product as a white solid (38.06 g, 91% yield). $^1$H NMR (400 MHz, CDCl$_3$) δ (ppm): 1.43 (t, 3H, CH$_3$), 3.97 (s, 2H, CH$_2$), 4.65 (q, 2H, CH$_2$).

Synthesis of γ-Benzyl-Glutamic Acid N-Thiocarboxyanhydrosulfide (BG NTA).

H-Glu(OBz)-OH (4.95 g, 20.9 mmol) and XAA (3.76 g, 20.9 mmol) were suspended in a saturated NaHCO$_3$ aqueous solution (70 mL). The suspension was stirred vigorously for 2 days at room temperature to afford a clear solution. The clear solution was then acidified with concentrated HCl to pH~3, followed by extraction with ethyl acetate (3×60 mL). The combined organic extract was dried with MgSO$_4$ and concentrated under vacuum. The oily residue was then re-dissolved in ethyl acetate (70 mL) under nitrogen, followed by the addition of PCl$_3$ (2.2 mL, 25 mmol) at room temperature. The reaction mixture was stirred at room temperature for 20 h and then sequentially washed with a saturated NaHCO$_3$ (aq) solution (100 mL), DI water (100 mL) and brine solution (100 mL). The organic phase was separated and dried over anhydrous MgSO$_4$ and concentrated under vacuum to afford a light yellow oil. The oil was dissolved in a minimum amount of THF and precipitated into excess hexanes with vigorous stirring to afford an off-white solid (3.24 g). The crude solid product was further purified by flash chromatography with ethyl acetate/hexanes (2:3, v/v) (R$_f$=0.33) off a silica gel column. A white solid (2.84 g, 49% yield) was collected after the chromatography purification. HRMS-ESI (m/z): [M+H]+ calculated for C$_{13}$H$_{14}$NO$_4$S 280.0638, found 280.0640. Melting point: 71.6° C.-72.5° C. $^1$H NMR (400 MHz, CDCl$_3$) δ (ppm): 7.42 (s, 1H, NH), 7.34 (m, 5H, C6H5), 5.12 (s, 2H, CH$_2$), 4.37 (t, 1H, CH), 2.55 (t, 2H, CH$_2$), 2.10-2.27 (m, 2H, CH$_2$). $^{13}$C NMR (400 MHz, CDCl$_3$) δ (ppm): 198.33, 172.43, 167.10, 135.42, 128.74, 128.57, 128.37, 67.02, 66.09, 29.46, 27.82.

Synthesis of ε-N-Carbobenzyloxy-Lysine N-Thiocarboxyanhydrosulfide (LYS NTA).

NaOH (2.87 g, 71.8 mmol) was dissolved in chilled DI H$_2$O (120 mL). H-Lys(Z)—OH (10.04 g, 35.8 mmol) and XAA (6.47 g, 35.9 mmol) were sequentially added to the above clear solution to afford a cloudy mixture. The reaction mixture was stirred vigorously for 3 days at room temperature followed by acidification with 4 M HCl to pH~3 and extraction with ethyl acetate (3×200 mL). The combined organic extract was dried over anhydrous MgSO$_4$ and then concentrated under vacuum to ~120 mL, to which PCl$_3$ (3.7 mL, 42 mmol) was added under nitrogen. The reaction was allowed to stir at room temperature for 20 h and then sequentially washed with a saturated NaHCO$_3$ (aq) solution (200 mL), DI water (100 mL) and brine solution (100 mL). The organic phase was separated, dried over anhydrous MgSO4 and concentrated under vacuum to afford a light yellow oil. The oil was re-dissolved in minimum THF and precipitated into excess hexanes under vigorous stirring to afford a white solid (8.26 g, 25.7 mmol, 72% crude yield).

A fraction of the crude solid (2.50 g, 7.76 mmol) was further purified by flash chromatography using gradient elution solvent diethyl ether/hexanes (from 4:1 to 10:1, v/v) (Rf=0.22 in 10:1 diethyl ether/hexanes) off a silica gel column. The final purified product was collected as a white solid (2.08 g, 83% yield) after the chromatography purification. HRMS-ESI (m/z): [M+H]+ calculated for $C_{15}H_{19}N_2O_4S$ 323.1060, found 323.1063. Melting point: 104.0° C.-105.1° C. $^1H$ NMR (400 MHz, DMSO-$d_6$) δ (ppm): 9.32 (s, 1H, NH), 7.33 (m, 5H, $C_6H_5$), 7.24 (t, 1H, NH), 5.01 (s, 2H, $CH_2$), 4.55 (t, 1H, CH), 3.00 (m, 2H, $CH_2$), 1.72 (m, 2H, $CH_2$), 1.40 (m, 4H, $CH_2CH_2$). $^{13}C$ NMR (500 MHz, $CDCl_3$) δ (ppm): 198.88, 167.38, 156.96, 136.55, 128.69, 128.34, 128.26, 67.03, 66.87, 40.23, 31.94, 29.39, 21.23.

Interfacial Ring-Opening Polymerization of NTAs.

A representative polymerization was conducted as follows. BG NTA (52.8 mg, 0.189 mmol) was suspended in hexanes (0.87 mL) in open air. A measured volume of a stock solution of hexylamine in hexanes (74.7 µL, 1.58 µmol, 133 mM) was added to the above mixture. The polymerization was stirred at 50° C. for 2 days to allow a near quantitative monomer conversion. The solvent was then removed under vacuum to afford the reaction mixture which was re-dissolved in DMF (TFA in the case of MET NTA iROP). The final polymer product was precipitated by adding excess diethyl ether into the polymer solution, separated by filtration and dried under vacuum to afford a white solid (36.2 mg, 91% yield).

Solution-Phase Ring-Opening Polymerization of NTAs.

A representative polymerization was conducted as follows. BG NTA (59.9 mg, 0.215 mmol) was dissolved in anhydrous dioxane (0.40 mL) under nitrogen atmosphere in glovebox. A measured volume of a stock solution of hexylamine in hexanes (31.1 µL, 1.79 µmol, 57.5 mM) was added to the above solution. The polymerization was stirred at 50° C. for 2 days before sampling a reaction aliquot for conversion analysis. The polymer was isolated by precipitation into diethyl ether, followed by filtration, diethyl ether wash and vacuum dry.

Various examples of the disclosed method are shown below in Table 1 and Table 2, which shows reactants and results of various polypeptide synthetic reactions. In each example, all reactions were allowed to proceed for 2 days. Examples 1-13 (Table 1) are interfacial ring opening polymerization reactions. In examples 1-13 BG NTA, LEU NTA and MET NTA have a concentration $[M]_0=0.2$ M, are dissolved in hexanes and the reaction is carried out at 50° C.; LYS NTA, have a concentration $[M_0]=0.2$ M, and are dissolved in heptane and the reaction is carried out at 80° C. Examples 1-23 (Table 2) are solution-phase ring opening polymerization reactions. In examples 1-23 BG NTA has a concentration $[M_0]=0.5$ M, is dissolved in dioxane or DMF, and the reaction is carried out at 50° C. Various polymerization initiators are used in the Examples including HA (hexylamine), TEA (triethylamine), HMDS (hexamethyldisilazane), Ni(BiPy)(COD) (Ni(2,2'-bipyridyl)(1,5-cyclooctadiene)). The $M_n$ (number average molecular weight) and PDI (molecular weight distribution) is determined by SEC-DRI-MALS analysis (dn/dc=0.1292 mL/g for PBG, 0.123 mL/g for PZLL in 0.1M LiBr/DMF at 25° C.). The conversion of the NTA monomers to polypeptide is determined by $^1H$ NMR analysis of reaction aliquots; Determined by end-group analysis from $^1H$ NMR in TFA-$d_1$.

TABLE 1

Interfacial polymerization of amino acid-derived NTAs using hexylamine

| Entry | Polym. State | Initiator | NTA | $[M]_0:[I]_0$ | $M_n$ (Theo.) (g/mol) | $M_n$ (Exp.)[c] (g/mol) | PDI[c] | conv[d] (%) |
|---|---|---|---|---|---|---|---|---|
| 1 | hetero (in air) | HA[b] | BG | 40:1 | 8700 | 9500 | 1.25 | 98 |
| 2 | hetero (in air) | HA[b] | BG | 80:1 | 17400 | 19000 | 1.21 | 99 |
| 3 | hetero (in $N_2$) | HA[b] | BG | 80:1 | 17100 | 18700 | 1.24 | 97 |
| 4 | hetero (in air) | HA[b] | BG | 120:1 | 25300 | 26800 | 1.21 | 96 |
| 5 | hetero (in air) | HA[b] | BG | 150:1 | 31600 | 29700 | 1.26 | 96 |
| 6 | hetero (in air) | HA[b] | LYS | 80:1 | 20600 | 19300 | 1.31 | 97 |
| 7 | hetero (in air) | HA[b] | LYS | 150:1 | 38700 | 37600 | 1.29 | 97 |
| 8 | hetero (in air) | HA[b] | LYS | 200:1 | 51600 | 50300 | 1.28 | 97 |
| 9 | hetero (in air) | HA[b] | MET | 40:1 | 5300 | 5500[e] | NA | 100 |
| 10 | hetero (in air) | HA[b] | MET | 80:1 | 10600 | 10300[e] | NA | 100 |
| 11 | hetero (in air) | HA[b] | LEU | 20:1 | 2400 | 2200 | 1.08 | 100 |
| 12 | hetero (in air) | HA[b] | LEU | 40:1 | 4600 | 4400 | NA | 100 |
| 13 | hetero (in air) | HA[b] | LEU | 80:1 | 10600 | 9000 | NA | 100 |

TABLE 2

Solution-phase polymerization of amino acid-derived NTAs using various initiators

| Entry # | Solvent | Temperature | NTA (ee) | Initiator[b] | $[M]_0:[I]_0$ | Conv. (%)[c] |
|---|---|---|---|---|---|---|
| 1 | DO | r.t | BG (2%) | HA | 50:1 | 57 |
| 2 | DO | r.t | BG (2%) | HA | 80:1 | 30 |
| 3 | DO | r.t | BG (2%) | HA | 120:1 | 5 |
| 4 | DO | r.t | BG (2%) | TEA | 50:1 | 13 |
| 5 | DO | r.t | BG (2%) | HMDS | 100:1 | 15 |
| 6 | DO | r.t | BG (2%) | Ni(BiPy) (COD) | 100:1 | 10 |
| 7 | DO | 50° C. | BG (2%) | TEA | 50:1 | 7 |
| 8 | DO | 50° C. | BG (2%) | HA | 120:1 | 12 |
| 9 | DO | 50° C. | BG (2%) | HMDS | 120:1 | 8 |
| 10 | DO | 50° C. | BG (2%) | Ni(BiPy) (COD) | 120:1 | 7 |
| 11 | DO | r.t | Leu (100%) | HA | 40:1 | 14 |
| 12 | DMF | r.t | Leu (100%) | HA | 40:1 | 22 |

TABLE 2-continued

Solution-phase polymerization of amino acid-derived NTAs using various initiators

| Entry # | Solvent | Temperature | NTA (ee)   | Initiator [b] | [M]$_0$:[I]$_0$ | Conv. (%) [c] |
|---------|---------|-------------|------------|---------------|-----------------|---------------|
| 13      | DO      | 50° C.      | Leu (100%) | HA            | 20:1            | 36            |
| 14      | DO      | 50° C.      | Leu (100%) | HA            | 40:1            | 23            |
| 15      | DO      | 50° C.      | Leu (100%) | HA            | 80:1            | 9             |
| 16      | DMF     | 50° C.      | Leu (100%) | HA            | 80:1            | 17            |
| 17      | DO      | r.t         | Lys (2%)   | HA            | 40:1            | 8             |
| 18      | DMF     | r.t         | Lys (2%)   | HA            | 40:1            | 25            |
| 19      | DO      | 80° C.      | Lys (2%)   | HA            | 80:1            | 14            |
| 20      | DMF     | 80° C.      | Lys (2%)   | HA            | 80:1            | 33            |
| 21      | DO      | 50° C.      | Met (0%)   | HA            | 40:1            | 9             |
| 22      | DO      | 50° C.      | Met (0%)   | HA            | 80:1            | 2             |
| 23      | DMF     | 50° C.      | Met (0%)   | HA            | 80:1            | 3             |

DO = 1,4-dioxane

Reference will now be made to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$ where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

As used herein, the term "polymer" refers to a molecule having at least one repeating unit and can include copolymers and oligomers.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

The invention claimed is:

1. A method of forming a polypeptide comprising:
contacting an amino acid-derived N-thiocarboxyanhydrosulfide monomer with a polymerization initiator in a nonpolar solvent to give a polypeptide.

2. The method of claim 1, wherein the N-thiocarboxyanhydrosulfide monomer has a structure according to Formula I:

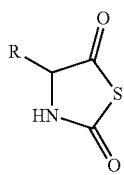

wherein R represents an amino acid side-chain.

3. The method of claim 2, wherein the amino acid side-chain is selected from the group consisting of glutamate, lysine, methionine, leucine, and combinations thereof.

4. The method of claim 1, wherein the polymerization initiator is selected from the group consisting of a $C_3$-$C_6$ alkyl amine, a $C_4$-$C_6$ cyclic amine, a $C_2$-$C_5$ heteroaryl, and combinations thereof.

5. The method of claim 4, wherein the $C_3$-$C_6$ alkyl amine is selected from the group consisting of butylamine, pentylamine, hexylamine, trimethylamine, and combinations thereof.

6. The method of claim 4, wherein the $C_4$-$C_6$ cyclic amine is selected from the group consisting of pyrrolidine, piperidine, piperazine, and combinations thereof.

7. The method of claim 4, wherein the $C_2$-$C_5$ heteroaryl is selected from the group consisting of pyrrole, imidazole, pyridine, and combinations thereof.

8. The method of claim 1, wherein the polymerization initiator is hexylamine.

9. The method of claim 1, wherein the nonpolar solvent comprises at least one alkane such that the contacting occurs as an alkane suspension of the amino acid-derived N-thiocarboxyanhydrosulfide monomer with the polymerization initiator.

10. The method of claim 9, wherein the at least one alkane is selected from the group consisting of pentanes, hexanes, heptanes, and combinations thereof.

11. The method of claim 10, wherein the at least one alkane comprises hexanes.

12. The method of claim 1, wherein the contacting occurs at an interface of a solid amino acid-derived N-thiocarboxyanhydrosulfide monomer.

13. The method of claim 1, wherein the polypeptide is a homopolymer or a random copolymer of the monomer.

14. A polypeptide formed according to the method of claim 1.

* * * * *